March 25, 1941. K. D. SMITH 2,236,013
HOMOGENIZER
Filed July 17, 1939
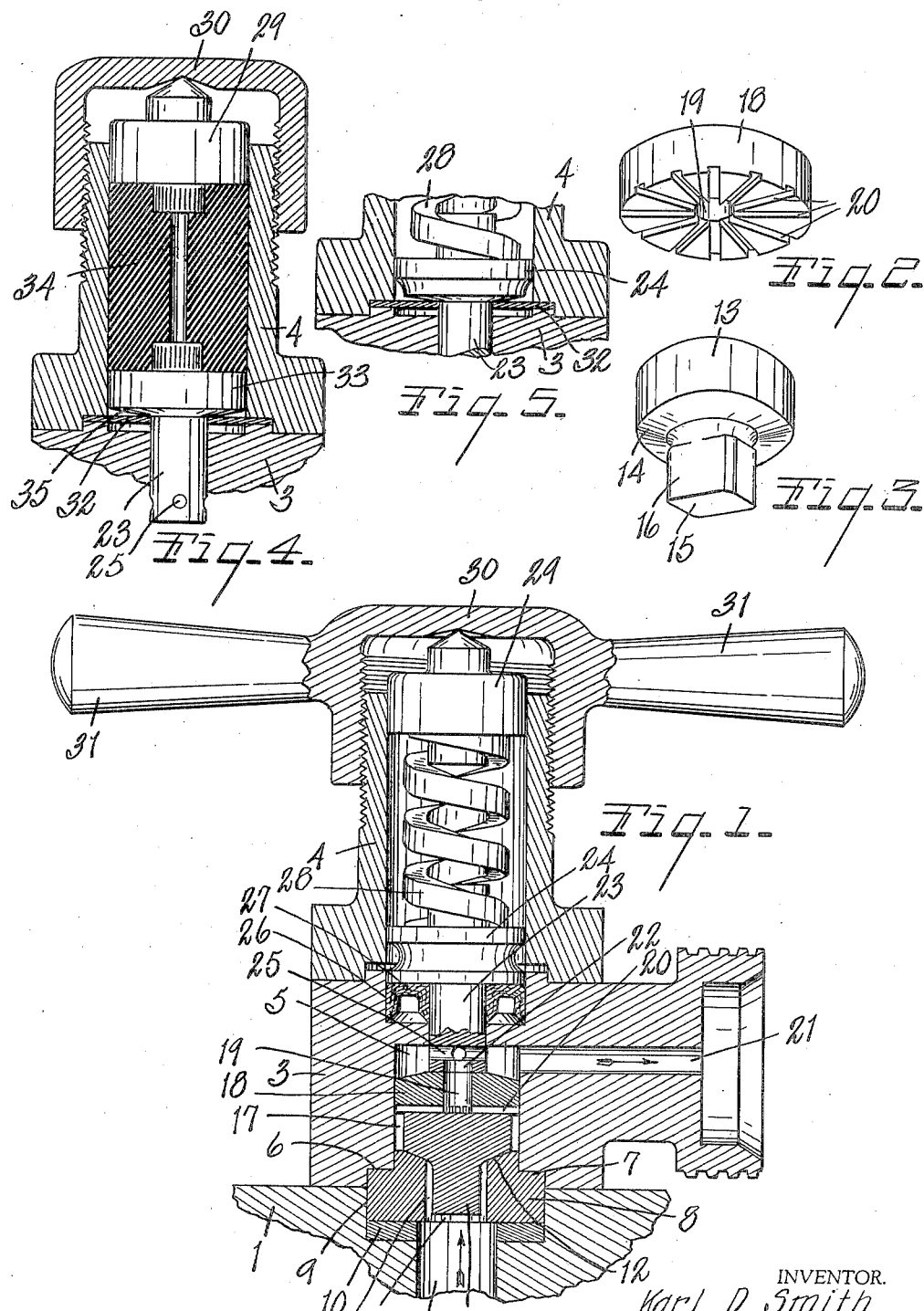
INVENTOR.
Karl D. Smith
BY Earl F. Chappell
ATTORNEYS Patented Mar. 25, 1941

2,236,013

UNITED STATES PATENT OFFICE 2,236,013

HOMOGENIZER

Karl D. Smith, Battle Creek, Mich., assignor to American-Marsh Pumps, Inc., Battle Creek, Mich., a corporation of Michigan Application July 17, 1939, Serial No. 284,838

9 Claims. (Cl. 99—265)

This invention relates to improvements in homogenizers.

The main objects of this invention are:

First, to provide a homogenizer valve assembly which is of large capacity and at the same time highly efficient, the product being very uniform and without undesired viscosity.

Second, to provide an improved homogenizer which may be adjusted to homogenize the product to any desired degree without increasing the viscosity of the product.

Third, to provide an apparatus of this character which is efficient at less pressures than those which are commonly essential in a homogenizing apparatus of the valve type.

Fourth, to provide an apparatus having these advantages which is simple in its parts and their assembly, there being relatively few parts and these simple in design so that they may not only be economically produced but readily assembled and disassembled for sanitary purposes.

Objects relating to details and economies of the invention will appear from the description to follow. The invention is defined and pointed out in the claims.

Preferred embodiments of the invention are illustrated in the accompanying drawing, in which:

Fig. 1 is a fragmentary view partially in vertical section of a preferred embodiment of my invention, only such parts of the apparatus being shown as are deemed necessary to illustrate my invention.

Fig. 2 is a bottom perspective view of the combined turbulence chamber and atomizing member of the assembly.

Fig. 3 is a bottom perspective view of the valve member.

Fig. 4 is a fragmentary view partially in vertical section of a modified form of pressure means and packing therefor.

Fig. 5 is a fragmentary view partially in section corresponding to that of Fig. 4 showing a coil type of pressure spring as distinguished from the rubber spring shown in Fig. 4.

In the accompanying drawing, 1 represents the body of a homogenizing machine provided with an inlet passage 2 for the products to be homogenized or emulsified. Milk and cream are products extensively treated by apparatus of this character although it is desirable for use in certain other products which it is desired to emulsify or homogenize—for example, certain salad compositions.

The product is supplied to the passage 2 by a suitable pressure pump and this is usually under high pressure and in order to effectively treat the products the pressures are sometimes so high that they are known to release certain leucocyte and epithelial cells carried by the creamy portion of the milk and cream in varying degrees in different seasons. Therefore, homogenization at low pressures is a desirable feature not only from the standpoint of the product but also the economy factor which is apparent when the necessity for high pressures is avoided, and I have found my apparatus practical when operated at approximately one-half the pressure commonly necessary, namely, in the neighborhood of 3,000 pounds per square inch.

The valve casing member 3 is detachably mounted on the body member 1, the mounting means not being illustrated, and the housing member 4 is detachably mounted on the valve casing. This is common practice and therefore the mounting means is not illustrated.

The valve casing member is provided with a valve chamber 5 preferably in the form of a cylindrical bore with a countersunk portion 6 at its lower end adapted to receive the shoulder 7 of the valve seat member 8.

The body member 1 is provided with a recess 9 adapted to receive the valve seat member and a packing 10, and the valve seat member is provided with a central inlet 11 surrounded by the conical valve seat 12.

The valve 13 is provided with a conical face 14 coacting with the valve seat as shown in Fig. 1 and is provided with a centering stem 15 engaging in the passage 11 of the valve seat member and having cut-away portions 16 providing for the passage of fluid to be treated. This centering of the valve 13 within the valve chamber provides an annular expansion space or chamber 17 surrounding the valve and to which the fluid passing the valve is delivered.

The concentrating or atomizing disk 18 is superimposed upon the valve and is a fairly close fit in the valve chamber so that it constitutes a partition element. This member 18 is provided with a central turbulence chamber and discharge passage 19 which has a plurality of radial passage grooves 20 in its underside. This member 18 resting upon the flat top of the valve 13 provides a series of radial passages preferably arranged in opposed pairs, as shown in Fig. 2, opening to the chamber 17 and to the chamber 19 so that the fluid passes from the chamber 17 through these passages to the turbulence chamber 19 to which they are delivered in an impinging atomizing relation.

The chamber 19 is connected to the discharge 21 of the valve casing through the short passage 22 in the stem 23 of the pressure member 24. This short passage 22 opens to the turbulence chamber and has radial delivery passages 25 delivering to the valve chamber in communication with the delivery passage 21.

In the embodiment shown in Fig. 1, the valve casing is provided with an upwardly facing packing chamber 26 receiving the packing 27 which is of U-cross section and which surrounds the stem 23, the pressure on the pressure member acting to compress and seal this packing. The packing in this embodiment is an annular packing of U-cross section disposed to face downwardly. The pressure member is subject to the coiled spring 28 which is engaged at its upper end by the thrust block 29 actuated by the threaded cap 30 having suitable hand pieces 31. This provides a simple and effective means for providing adjustable pressure.

In operation, the fluid, milk for example, is delivered under pressure to the valve, the valve being adjusted to break up the fat globules to the desired extent. This operation frequently results in rendering the product undesirably viscous due to the clustering of the broken-up fat globules. I therefore provide an expansion chamber 17 to which the fluid passing the valve delivers and from this the fluid is delivered through the radial passages which are of relatively small dimensions to the turbulence or atomizing chamber 19. The streams of fluid are delivered from these passages in an impinging turbulence-producing relation which I have found to be highly efficient in the breaking up or destroying or minimizing the clustering referred to or, in other words, eliminating the undesired viscosity. The product is further agitated as it is delivered through the passages 25 into the valve chamber.

My improved homogenizing apparatus is highly efficient and, as stated, is capable of satisfactory performance under relatively low pressures which is advantageous both from the standpoint of economy and operation and also in that it does not release the cells above referred to.

In the embodiment of my invention shown in Fig. 4, the packing member is omitted and a disk-like packing 32 of suitable flexible material is clamped between the housing 4 and the valve casing. The stem of the pressure member 33 is arranged through this flexible packing disk. In this embodiment, a rubber spring element 34 is arranged in and supported by the walls of the housing with its lower end in engagement with the pressure member and the thrust member 29 acting upon its upper end.

In the embodiment shown in Fig. 5, a coil spring 28 is substituted for the rubber spring. It will be noted that the underside 35 of the pressure member 33 is shaped like an inverted cone to relieve the packing disk of any undue strains.

I have illustrated and described my improvements in an embodiment which I have found highly satisfactory. I have not attempted to illustrate and describe certain modifications and adaptations which I contemplate as it is believed that this disclosure will enable those skilled in the art to embody or adapt the same as may be desired.

Having thus described my invention, what I claim as new and desire to secure by Letters Patent, is:

1. In a homogenizer, the combination with a valve casing member provided with a valve chamber having a discharge and an upwardly facing packing chamber, there being a central opening between said chambers, of an upwardly facing valve seat member having a central inlet passage and an inwardly facing valve seat surrounding said inlet, a valve coacting with said valve seat and having a flat top and a centering stem disposed in said inlet passage centering the valve within said valve chamber for providing an annular expansion chamber for the fluid passing the valve, a disk superimposed on said valve in fitting relation to the walls of the valve chamber and having a central turbulence chamber, and a plurality of radially disposed grooves in its underside opening to the said turbulence chamber and to said expansion chamber and coacting with the top of the valve to provide a plurality of radially disposed passages discharging the fluid to said turbulence chamber in an impinging relation, a pressure member having a stem projecting through said opening between said packing chamber and said valve chamber to engage said disk and having a discharge passage opening to said turbulence chamber and to said valve chamber, a packing arranged in said packing chamber, and means for applying pressure to said pressure member.

2. In a homogenizer, the combination with a valve casing member provided with a valve chamber having a discharge and an upwardly facing packing chamber, there being a central opening between said chambers, of an upwardly facing valve seat member having a central inlet passage, an inwardly facing valve seat surrounding said inlet, a valve coacting with said valve seat, there being an annular expansion chamber for the fluid passing the valve, a member superimposed on said valve and having a central turbulence chamber, a plurality of radially disposed discharge passages between said valve and last named member for discharging the fluid from said expansion chamber to said turbulence chamber in an impinging relation, a pressure member having a stem projecting through said opening between said packing member and said valve chamber to engage said disk and having a discharge passage opening to said turbulence chamber and to said valve chamber, a packing arranged in said packing chamber, and means for applying pressure to said pressure member.

3. In a homogenizer, the combination with a valve casing member provided with a valve chamber having a discharge, of an upwardly facing valve seat member having a central inlet passage and an inwardly facing valve seat surrounding said inlet, a valve coacting with said valve seat and having a flat top and a centering stem disposed in said inlet passage centering the valve within said valve chamber for providing an annular expansion chamber for the fluid passing the valve, a disk superimposed on said valve in fitting relation to the walls of the valve chamber and having a central turbulence chamber, and a plurality of radially disposed grooves in its underside opening to the said turbulence chamber and to said expansion chamber and coacting with the top of the valve to provide a plurality of radially disposed passages discharging the fluid to said turbulence chamber in an impinging relation.

4. In a homogenizer, the combination with a valve casing member provided with a valve chamber having a discharge, of an inwardly facing valve seat member having a central inlet passage, a valve coacting with said valve seat, there being an annular expansion chamber for the fluid passing the valve, a member superimposed on said valve and having a central turbulence chamber, a plurality of radially disposed discharge passages between said valve and last named member for discharging the fluid from said expansion chamber to said turbulence chamber in an impinging relation, and means for applying pressure to said valve.

5. In a homogenizer, the combination with a valve casing member provided with a valve chamber having a discharge, of an upwardly facing valve seat member having a central inlet passage, a valve coacting with said valve seat and having a flat top and a centering stem disposed in said inlet centering the valve within said valve chamber and providing a surrounding annular expansion chamber for the fluid passing the valve, and a disk superimposed on said valve in fitting relation to the walls of the valve chamber and having a central turbulence chamber in communication with said discharge, and a plurality of radially disposed grooves in its underside opening to the said turbulence chamber and to said expansion chamber and coacting with the top of the valve to provide radially disposed passages discharging the fluid to said turbulence chamber in an impinging relation.

6. In a homogenizing device, the combination with a valve casing having a cylindrical valve chamber, of an inwardly facing valve seat member having a central inlet passage, a valve coacting with said valve seat member, there being an annular expansion chamber surrounding said valve to receive the discharge thereof, a disk constituting a partition for said valve chamber superimposed on said valve and having a central turbulence and delivery chamber, and a plurality of radial passages opening thereto and to said expansion chamber, said passages being arranged in opposed pairs so that they deliver to said turbulence chamber in an impinging turbulence-producing relation.

7. In a homogenizer, the combination with a valve casing member provided with a valve chamber having a discharge and an inlet surrounded by an inwardly facing valve seat, of a valve coacting with said valve seat, there being an annular expansion chamber surrounding said valve for receiving the fluid discharged therefrom, and a member disposed on said valve and having a central turbulence chamber communicating with the discharge of the valve casing, and a plurality of radially disposed passages between said valve and member communicating with said expansion chamber and with said turbulence chamber and discharging fluid thereto in an impinging relation.

8. In a homogenizer, the combination of a valve casing member provided with a valve chamber having a discharge and an inwardly facing valve seat provided with an inlet, a valve coacting with said seat, said casing member having an expansion chamber receiving the fluid passing the valve, a turbulence chamber communicating with the discharge of the valve casing, and a plurality of passages each of relatively small capacity opening to said expansion chamber and delivering to said turbulence chamber in opposed pairs whereby the fluid is discharged to said turbulence chamber in an impinging relation.

9. In a homogenizer, the combination with a valve casing member provided with a valve chamber having a discharge, of an inwardly facing valve seat having an inlet associated therewith, a valve coacting with said valve seat, a chamber surrounding the valve for receiving the fluid passing the valve, and a plurality of passages for discharging the fluid from said chamber arranged radially of the chamber so that the fluid is discharged therefrom in an impinging relation, the discharge of said passages being in communication with the discharge of said valve chamber.

KARL D. SMITH.